(12) United States Patent
Kane

(10) Patent No.: US 7,722,134 B2
(45) Date of Patent: May 25, 2010

(54) FAILSAFE ELECTRONIC BRAKING SYSTEM FOR TRAINS

(75) Inventor: Mark Edward Kane, Orange Park, FL (US)

(73) Assignee: Invensys Rail Corporation, Louisville, KY (US)

( * ) Notice: Subject to any disclaimer, the term of this patent is extended or adjusted under 35 U.S.C. 154(b) by 1 day.

(21) Appl. No.: 10/960,970

(22) Filed: Oct. 12, 2004

(65) Prior Publication Data

US 2006/0076826 A1    Apr. 13, 2006

(51) Int. Cl.
*B60T 8/34* (2006.01)
*B60T 8/88* (2006.01)

(52) U.S. Cl. .............................. 303/128; 303/20; 246/3; 701/19

(58) Field of Classification Search .................... 303/3, 303/15, 20, 128, 122.03, 122.05; 188/1.11 E; 701/70, 76, 92, 19, 20; 246/167 R, 169 R, 246/182 A, 182 B, 3, 5, 20
See application file for complete search history.

(56) References Cited

U.S. PATENT DOCUMENTS

| | | | |
|---|---|---|---|
| 2,986,629 A * | 5/1961 | Hines | 246/169 R |
| 3,711,849 A * | 1/1973 | Hasenbalg | 345/26 |
| 4,107,253 A * | 8/1978 | Borg et al. | 701/20 |
| 4,181,943 A | 1/1980 | Mercer, Sr. et al. | |
| 4,306,694 A | 12/1981 | Kuhn | |
| 4,316,640 A * | 2/1982 | Cripe | 303/20 |
| 4,459,668 A | 7/1984 | Inoue et al. | |
| 4,561,057 A | 12/1985 | Haley, Jr. et al. | |
| 4,711,418 A | 12/1987 | Aver, Jr. et al. | |
| 4,728,063 A | 3/1988 | Petit et al. | |
| 4,886,226 A | 12/1989 | Frielinghaus | |
| 5,072,900 A | 12/1991 | Malon | |
| 5,129,605 A | 7/1992 | Burns et al. | |
| 5,145,131 A | 9/1992 | Franke | |
| 5,177,685 A | 1/1993 | Davis et al. | |
| 5,332,180 A | 7/1994 | Peterson et al. | |
| 5,340,062 A | 8/1994 | Heggestad | |
| 5,355,032 A * | 10/1994 | Rogers et al. | 326/65 |
| 5,364,047 A | 11/1994 | Petit et al. | |
| 5,394,333 A | 2/1995 | Kao | |

(Continued)

OTHER PUBLICATIONS

WordReference.com English Dictionary defintion of "electronic device".*

(Continued)

*Primary Examiner*—Melody M Burch
(74) *Attorney, Agent, or Firm*—DLA Piper LLP (US)

(57) ABSTRACT

A method and system for providing true failsafe control of an electronic braking system by a train control system which controls a switch that supplies power to the electronic braking system. When the train control system determines that it is necessary to activate the train's brakes, it controls the switch so as to remove power to the electronic braking system, which results in activation of the train's brakes. In highly preferred embodiments, the switch is of a type that is normally open and that requires the presence of an electrical signal to close the switch to supply power to the electronic braking system. In such embodiments, any loss in power to the train control system will result in a loss of signal to the switch, thereby causing activation of the train's brakes.

21 Claims, 2 Drawing Sheets

U.S. PATENT DOCUMENTS

| | | | |
|---|---|---|---|
| 5,398,894 A | 3/1995 | Pascoe | |
| 5,452,870 A | 9/1995 | Heggestad | |
| 5,470,034 A | 11/1995 | Reeves | |
| 5,504,469 A * | 4/1996 | McGrane | 336/206 |
| 5,533,695 A | 7/1996 | Heggestad et al. | |
| 5,620,155 A | 4/1997 | Michalek | |
| 5,699,986 A | 12/1997 | Welk | |
| 5,740,547 A | 4/1998 | Kull et al. | |
| 5,743,495 A | 4/1998 | Welles, II et al. | |
| 5,751,569 A | 5/1998 | Metel et al. | |
| 5,803,411 A | 9/1998 | Ackerman et al. | |
| 5,828,979 A | 10/1998 | Polivka et al. | |
| 5,867,122 A | 2/1999 | Zahm et al. | |
| 5,944,768 A | 8/1999 | Ito et al. | |
| 5,950,966 A | 9/1999 | Hungate et al. | |
| 5,978,718 A | 11/1999 | Kull | |
| 5,995,881 A | 11/1999 | Kull | |
| 6,049,745 A | 4/2000 | Douglas et al. | |
| 6,081,769 A | 6/2000 | Curtis | |
| 6,102,340 A | 8/2000 | Peek et al. | |
| 6,112,142 A | 8/2000 | Shockley et al. | |
| 6,135,396 A | 10/2000 | Whitfield et al. | |
| 6,179,252 B1 | 1/2001 | Roop et al. | |
| 6,218,961 B1 | 4/2001 | Gross et al. | |
| 6,311,109 B1 | 10/2001 | Hawthorne et al. | |
| 6,322,025 B1 | 11/2001 | Colbert et al. | |
| 6,345,233 B1 | 2/2002 | Erick | |
| 6,371,416 B1 | 4/2002 | Hawthorne | |
| 6,373,403 B1 | 4/2002 | Korver et al. | |
| 6,374,184 B1 | 4/2002 | Zahm et al. | |
| 6,377,877 B1 | 4/2002 | Doner | |
| 6,397,147 B1 | 5/2002 | Whitehead | |
| 6,421,587 B2 | 7/2002 | Diana et al. | |
| 6,456,937 B1 | 9/2002 | Doner et al. | |
| 6,459,964 B1 | 10/2002 | Vu et al. | |
| 6,459,965 B1 | 10/2002 | Polivka et al. | |
| 6,487,478 B1 | 11/2002 | Azzaro et al. | |
| 6,609,049 B1 | 8/2003 | Kane et al. | |
| 6,701,228 B2 | 3/2004 | Kane et al. | |
| 6,824,110 B2 | 11/2004 | Kane et al. | |
| 6,853,888 B2 | 2/2005 | Kane et al. | |
| 6,854,953 B2 | 2/2005 | Van Drentham-Susman et al. | |
| 6,863,246 B2 | 3/2005 | Kane et al. | |
| 2001/0056544 A1 | 12/2001 | Walker | |
| 2002/0070879 A1 | 6/2002 | Gazit et al. | |
| 2002/0096605 A1 | 7/2002 | Berry et al. | |
| 2003/0117333 A1 | 6/2003 | McLean | |
| 2003/0225490 A1 | 12/2003 | Kane et al. | |
| 2004/0006411 A1 | 1/2004 | Kane et al. | |
| 2004/0006413 A1 | 1/2004 | Kane et al. | |
| 2004/0073342 A1 | 4/2004 | Kane et al. | |
| 2004/0095737 A1 * | 5/2004 | Wu et al. | 361/813 |
| 2004/0102877 A1 | 5/2004 | Kane et al. | |
| 2004/0181320 A1 | 9/2004 | Kane et al. | |
| 2004/0236482 A1 | 11/2004 | Kane et al. | |
| 2005/0004722 A1 | 1/2005 | Kane et al. | |

OTHER PUBLICATIONS

WordReference.com English Dictionary definition of "electronically".*
WordReference.com English Dictionary defintion of "electronic".*
Lundsten, Carsten S., "Railroad Rules, Signalling, Operations: Track Warrant Control", Nov. 78, 1998.
"System Architecture, ATCS Specification 100", May 1995.
"A New World for Communications & Signaling", Progressive Railroading, May 1986.
"Advanced Train Control Gain Momentum", Progressive Railroading, Mar. 1986.
"Railroads Take High Tech in Stride", Progressive Railroading, May 1985.
Moody, Howard G., "Advanced Train Control Systems A System to Manage Railroad Operations", Railway Fuel and Operating Officers Association, Annual Proceedings, 1993.
Ruegg, G.A., "Advanced Train Control Systems ATCS", Railway Fuel and Operating Officers Association, Annual Proceedings, 1986.
Malone, Frank, "The Gaps Start to Close"Progressive Railroading, May 1987.
"On the Threshold of ATCS", Progressive Railroading, Dec. 1987.
"CP Advances in Train Control", Progressive Railroading, Sep. 1987.
"Communications/Signaling: Vital for dramatic railroad advances", Progressive Railroading, May 1988.
"Testimony of Jolene M. Molitoris, Federal Railroad Administrator, U.S. Department of Transportation before the House Committee on Transportation and Infrastructure Subcommittee on Railroads", Federal Railroad Administration, United States Department of Transportation, Apr. 1, 1998.
"ATCS's System Engineer", Progressive Railroading, Jul. 1988.
"$C^3$ Comes to the Railroads", Progressive Railroading, Sep. 1989.
"The Electronic Railroad Emerges", Progressive Railroading, May 1989.
"ATCS on Verge of Implementation", Progressive Railroading, Dec. 1989.
"ATCS Evolving on Railroads", Progressive Railroading, Dec. 1992.
"High Tech Advances Keep Railroads Rolling", Progressive Railroading, May 1994.
"FRA Promotes Technology to Avoid Train-To-Train Collisions", Progressive Railroading, Aug. 1994.
"ATCS Moving slowly but Steadily from Lab for Field", Progressive Railroading, Dec. 1994.
Judge, T., "Electronic Advances Keeping Railroads Rolling", Progressive Railroading, Jun. 1995.
"Electronic Advances Improve How Railroads Manage", Progressive Railroading, Dec. 1995.
Judge, T., "BNSF/UP PTS Pilot Advances in Northwest", Progressive Railroading, May 1996.
Foran, P., "Train Control Quandary, Is CBTC viable? Railroads, Suppliers Hope Pilot Projects Provide Clues", Progressive Railroading, Jun. 1997.
"PTS Would've Prevented Silver Spring Crash: NTSB", Progressive Railroading, Jul. 1997.
Foran, P., "A 'Positive' Answer to the Interoperability Call", Progressive Railroading, Sep. 1997.
Foran, P., "How Safe is Safe Enough?", Progressive Railroading, Oct. 1997.
Foran, P., "A Controlling Interest in Interoperability", Progressive Railroading, Apr. 1998.
Derocher, Robert J., "Transit Projects Setting Pace for Train Control", Progressive Railroading, Jun. 1998.
Kube, K., "Variations on a Theme", Progressive Railroading, Dec. 2001.
Kube, K., "Innovation in Inches", Progressive Railroading, Feb. 2002.
Vantuono, W., "New York Leads a Revolution", Railway Age, Sep. 1996.
Vantuono, W., "Do you know where your train is?", Railway Age, Feb. 1996.
Gallamore, R., "The Curtain Rises on the Next Generation", Railway Age, Jul. 1998.
Burke, J., "How R&D is Shaping the 21st Century Railroad", Railway Age, Aug. 1998.
Vantuono, W., "CBTC: A Maturing Technology", Third International Conference on Communications Based Train Control, Railway Age, Jun. 1999.
Sullivan, T., "PTC—Is FRA Pushing Too Hard?", Railway Age, Aug. 1999.
Sullivan, T., "PTC: A Maturing Technology", Railway Age, Apr. 2000.
Moore, W., "How CBTC Can Increase Capacity", Railway Age, Apr. 2001.
Vantuono, W., "CBTC: The Jury is Still Out", Railway Age, Jun. 2001.
Vantuono, W., "New-tech Train Control Takes Off", Railway Age, May 2002.

Union Switch & Signal Intermittent Cab Signal, Bulletin 53, 1998.

GE Harris Product Sheet: "Advanced Systems for Optimizing Rail Performance" and "Advanced Products for Optimizing train Performance", undated.

GE Harris Product Sheet: "Advanced, Satellite-Based Warning System Enhances Operating Safety", undated.

Furman, E., et al., "Keeping Track of RF", GPS World, Feb. 2001.

* cited by examiner

FAILSAFE ELECTRONIC BRAKING SYSTEM FOR TRAINS

BACKGROUND OF THE INVENTION

In the early days of railroads, train brakes were operated by brakemen who would go from car to car and manually activate and deactivate the brakes on the train. Having brakemen on each train added to the expense of operating the train. This added expense led to the development of air brakes by, among others, George Westinghouse.

For much of the previous century, the most common form of braking system was the air brake system. In this system, pressurized air is distributed via an air brake pipe system to each brake caliper on each train. The brake calipers are designed such that the brake shoes engage the train wheel to stop the train if the pressurized air flow is disrupted. These systems typically include what is referred to in the art as a "P2A" valve, which is used for a "penalty" braking. Penalty braking, which is distinct from emergency braking, is the activation of the train's brakes to stop the train when the train is operating, or about to be operated, in an unsafe manner. The typical P2A valve is connected to the brake pipe and typically provides for a full service application of the brakes at the service rate when opened. The P2A valve is electrically controlled, usually employing a solenoid. This allows the P2A valve to be controlled by an overspeed signal from a speed indicator connected to the train's axle drive tachometer, by a penalty brake signal from a cab signal system, or by an alerter. These air brake systems that include a P2A valve are failsafe in that any loss of air pressure in the brake lines (whether due to a leak in the brake line or a failure in the air pump), or any disruption in power to the P2A valve, results in the brakes activating and the train being brought to a stop safely.

More recently, electronic braking systems have appeared. These systems electronically control the application of the brakes. These systems are required to be failsafe by the federal government in that any loss of power to the electronic braking system must result in the train brakes activating to stop the train much in the same way that any loss of power to the P2A valves would result in activation of the train brakes.

In addition to electronic braking systems, train control systems are also known in the art. Train control systems are systems that control the movement of a train by controlling the locomotive's engine/motor and brakes to ensure that the train is operated safely. These systems come in two varieties: active and passive. Active control systems are systems that are primarily responsible for controlling movement of the train. In contrast, in passive control systems, a human operator is primarily responsible for controlling movement of the train and the passive control system only assumes control if the operator attempts to operate the train in an unsafe manner (e.g., exceeding a maximum allowable speed, entering an occupied block, etc.). Types of train control systems include Cab Signal, Positive Train Control, Positive Train Stop and others. The assignee of the present application, Quantum Engineering, Inc., markets a Positive Train Control system under the mark TRAIN SENTINEL™.

In order for a train control system of any type to be capable of stopping a train, it must be capable of controlling the train's braking system. These electronic braking systems are typically integrated, sealed units that are not easily modified. Thus, in the past, it has typically been necessary to enlist the assistance of the manufacturer of the electronic braking system to modify the electronic braking system to allow for a penalty application of the brakes by a train control system.

Typical electronic braking systems provide an RS-232 interface through which a train control system can send a request to activate the brakes. However, such a system is not failsafe. For example, if the connection between the train control system and the RS-232 interface is broken, or the RS-232 interface on the electronic braking system fails, a brake activation request message from the train control system to the electronic braking system will not be received by the electronic braking system and the brakes will not be activated, leading to a potentially dangerous situation.

Moreover, even if the brake activation request message is received, the electronic braking system may experience a delay in responding to the message. Any delay can, of course, result in a catastrophe. There is yet another problem associated with a potential delay. Some known train control systems, including the Train Sentinel system sold by the assignee of the present invention, will prevent a train from taking an improper action (e.g., entering a block which the train is not authorized to enter) by calculating in advance precisely when a penalty brake application must be applied to avoid the improper action, and then causing the penalty brake application to occur at that time if the operator has not acted to avoid the improper action. The possibility that an electronic braking system will delay in activating the brakes in response to a penalty brake activation request message means that the penalty brake activation request message must be sent in advance of the time in which the brakes need to be activated—in other words, a safety factor must be added to account for the delay must be provided. There are two problems with such a safety factor: 1) it is difficult to determine how large the safety factor must be, and 2) in those instances in which there is no delay, or in which the delay is less than the safety factor, the brakes activate prematurely. Premature penalty brake activation can be very annoying to the operator and can be costly because the train will stop well short of the intended point and because of the lost time required to stop and restart the train.

SUMMARY OF THE INVENTION

The present invention addresses the aforementioned issues to a great extent by providing a method and apparatus for providing more accurate and true failsafe control of an electronic braking system by a train control system. In preferred embodiments, the train control system controls a switch that supplies power to the electronic braking system. When the train control system determines that it is necessary to activate the train's brakes to stop the train, it controls the switch so as to remove power to the electronic braking system, which results in immediate activation of the train's brakes. In highly preferred embodiments, the switch is of a type that is normally open and that requires the presence of an electrical signal to close the switch to supply power to the electronic braking system. In such embodiments, any loss in power to the train control system will result in a loss of signal to the switch, thereby causing activation of the train's brakes.

BRIEF DESCRIPTION OF THE DRAWINGS

The aforementioned advantages and features of the present invention will be more readily understood with reference to the following detailed description and the accompanying drawings in which.

DETAILED DESCRIPTION

In the following detailed description, a plurality of specific details, such as types of train control systems and types of switches used for controlling the supply of electrical power to an electronic braking system, are set forth in order to provide a thorough understanding of the present invention. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

Figure 1:
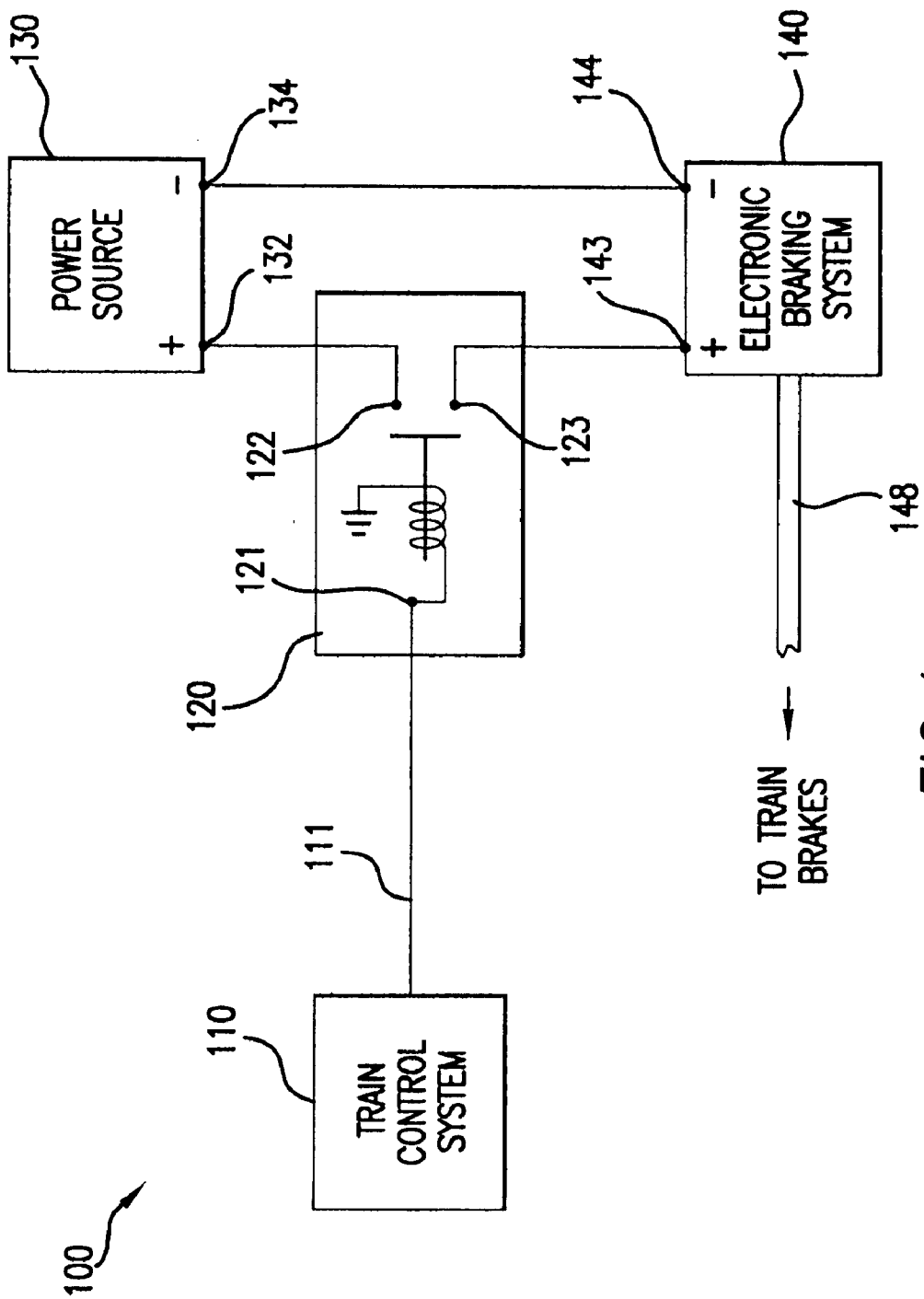
FIG. 1 is a block diagram of a train control system according to one embodiment of the invention.

Referring now to FIG. 1, a system 100 includes a train control system 110. The train control system 110 may be any control system known in the art, including but not limited to the systems discussed above. Preferably the train control system is similar to one of the systems described in U.S. patent application Ser. Nos. 10/186,426; 10/300,852; 10/267,959; or 10/157,874 (now U.S. Pat. No. 6,701,228). The contents of each of the foregoing applications are hereby incorporated by reference herein. The principal difference between the train control systems described in the aforementioned applications and the train control system 110 illustrated in FIG. 1 is that the train control system 110 of FIG. 1 does not include a brake interface that directly controls the electronic braking system 140.

The train control system 110 is able to cause penalty braking through its connection to a control input 121 of a solenoid 120. The solenoid 120 controls the supply of power from power source 130 to an electronic braking system 140, which controls the brakes of a train on which the system 110 is installed. Controls connected to the electronic braking system 140 which are typically installed in a locomotive allow an engineer to selectively apply the brakes wholly or partially to control movement of the train.

The solenoid 120 is connected such that power will only be supplied from the power source 130 to the electronic braking system 140 while the train control system 110 outputs a positive voltage on output line 111. The positive output 132 of power supply 130 is connected to a high power terminal 122 of the solenoid 120. The other high power terminal 123 of the solenoid 120 is connected to the positive input 143 of the electronic braking system 140. The negative terminal 134 of the power source 130 is connected to the negative terminal 144 of the electronic braking system 140. In this fashion, while a positive voltage is applied to the control terminal 121 of the solenoid 120, a connection between terminals 122 and 123 of the solenoid 120 is maintained and power flows from the power source 130 to the electronic braking system 140.

However, if the positive voltage supplied from the train control system 110 to the solenoid 120 via line 111 is interrupted for any reason, the supply of power to the electronic braking system 140 will be disrupted. The voltage on line 111 may be interrupted if the train control system 110 determines that the train should be stopped, if there is a break in the line 111, or if the train control system 110 loses power. Regardless of the cause, loss of voltage on line 111 will cause the solenoid 120 to open the connection between terminals 122 and 123, thereby cutting off power to the electronic braking system 140.

When the electronic braking system 140 loses power, it will automatically open an internal valve, which will cause a loss of pressure in the air brake pipe 148. This in turn will activate all of the brakes on the train, thereby bringing the train to a stop.

The aforementioned embodiment provides several important benefits. First, it provides a true failsafe system. Second, it provides more accurate braking because it eliminates the necessity of building in a safety factor delay when activating the brakes. Because the train control system 110 can directly control the solenoid 120 (rather than sending a brake request message to the electronic braking system 140), the train control system 110 can wait until it is absolutely necessary to activate the brakes to prevent an improper action such as entering an occupied block or exceeding a track warrant/authority. This avoids the premature penalty braking problem discussed above.

Figure 2:
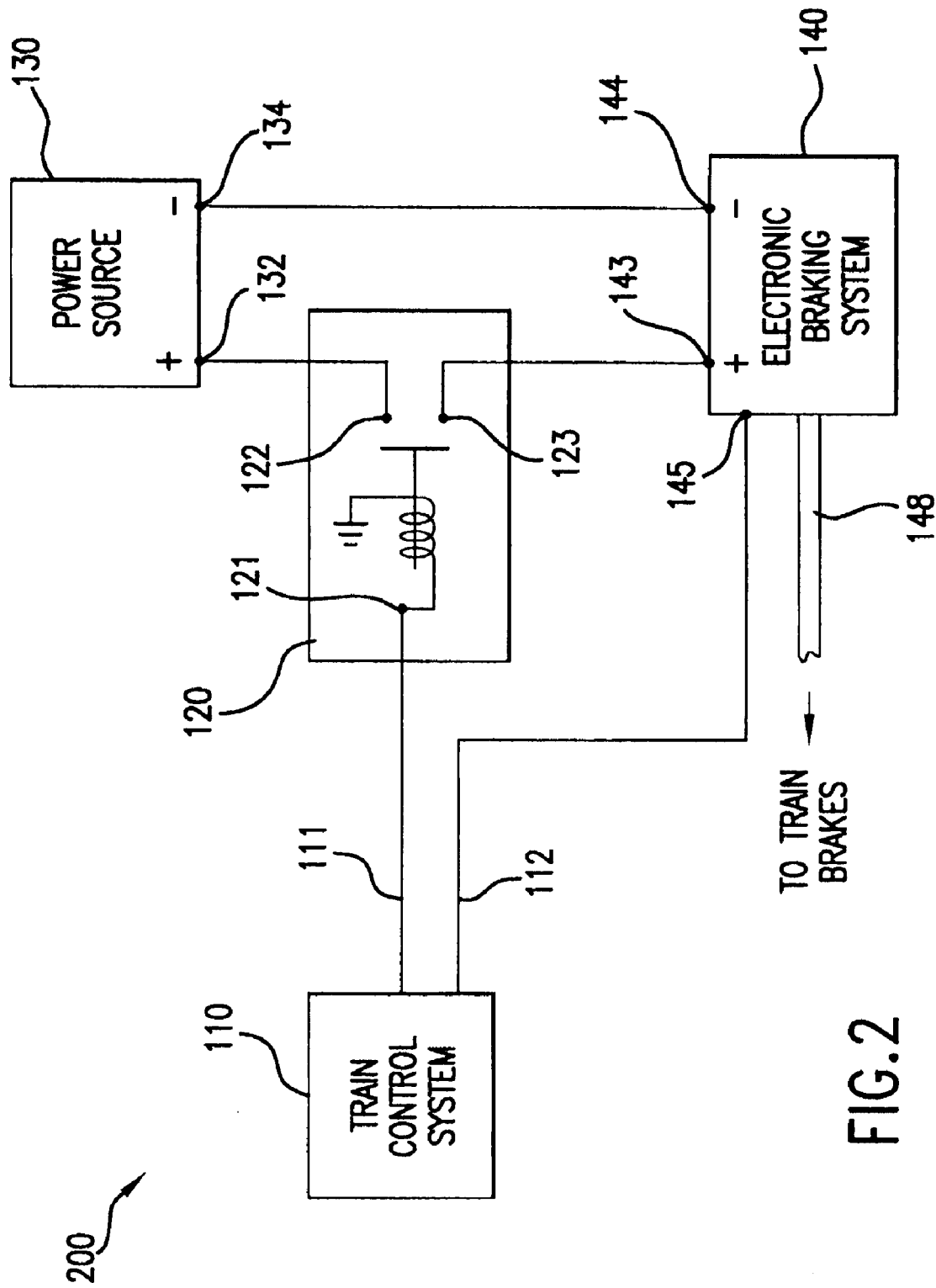
FIG. 2 is a block diagram of a train control system according to a second embodiment of the invention.

A system 200 according to a second embodiment of the invention is illustrated in FIG. 2. The system 200 includes a train control system 110 that includes a brake control output 112 that is connected to the electronic braking system 140. The brake control output 112 may be digital (e.g., a logical command) or analog. The brake control output allows the train control system 110 to control the train's brakes via the electronic braking system 140 such that either full or graduated braking may be applied. As used herein, "full braking" means that the full braking force of the brakes are applied, whereas graduated braking means that some fraction of the available braking force is applied. Graduated braking may be used to slow a train rather than bring it to a halt.

It should be noted that either full or graduated braking may or may not be applied as a penalty. That is, in embodiments of the invention in which the train control system 110 is active, the activation of the brakes via output 112 may constitute a normal part of operating the train. In embodiments of the invention in which the train control system 110 is passive, the activation of the brakes via line 112 may be a penalty brake application. A full braking penalty may be applied when, e.g., a train is in danger of exceeding a track warrant. A partial braking penalty may be applied when, e.g., a train is in danger of violating a speed restriction. In this case, the brakes are partially applied such that the train's speed is reduced to the applicable limit prior to the train's entry into the region covered by the speed restriction.

In embodiments of the invention such as the system 200 of FIG. 2 in which the electronic braking system 140 provides an input for a train control system, the line 111 that allows the train control system 110 to control the solenoid 120 to interrupt power to the electronic braking system 140 provides additional failsafe control. That is, if the electronic braking system 140 does not respond to a braking signal sent to the electronic braking system directly from the train control system 110 via output 112, the train control system 110 can control the solenoid 120 to cut the power to the electronic braking system 140 via line 111. As discussed above, this will cause a full braking application.

It is possible to send a penalty brake request message via output 112 and then, if the request is not executed within a certain period of time, force the penalty brake application by controlling the solenoid 120 via line 111. As discussed above, this means that a safety factor will need to be built-in such that the forced penalty brake application via line 111 will occur prior to an unsafe condition even if the penalty brake request message sent via output 112 is not acted on immediately by the electronic braking system 140. While this is a drawback for the reasons discussed above, it may be desirable to operate in this manner.

The embodiments discussed above employ a solenoid 120 to allow the train control system 110 to control the power supplied to the electronic braking system 140. Those of skill in the art will recognize that any type of electrically controlled switch could be used in place of solenoid 120. Among possible alternatives to the solenoid 140 are relays and transistors.

Obviously, numerous other modifications and variations of the present invention are possible in light of the above teachings. It is therefore to be understood that within the scope of the appended claims, the invention may be practiced otherwise than as specifically described herein.

What is claimed is:

1. A method for controlling a train comprising the steps of:
   determining on a train control computer separate from an electronic braking system that the brakes of a train should be activated in order to prevent the train from violating a restriction on movement of the train, the brakes being controlled by an electronic braking system on the train, the electronic braking system being configured to activate the brakes if power to the electronic braking system is disrupted, the electronic braking system including a train control interface operable to receive a digital brake activation message from a train control system;
   sending a digital brake activation message to the electronic braking system via the train control interface to activate the brakes;
   detecting that the digital brake activation message did not result in activation of the train's brakes; and
   controlling via a conductor separate from any conductor connected to the train control interface an electrically operated switch connected between the electronic braking system and a power source so as to prevent the power source from supplying power to the electronic braking system such that the train's brakes are activated to prevent violation of the restriction in response to detecting that the digital brake activation message did not result in activation of the train's brakes.

2. The method of claim 1, wherein the train control interface is an RS-232 interface.

3. The method of claim 1, wherein the digital brake activation message is in the form of a multiple bit digital command.

4. The method of claim 1, wherein the electrically operated switch is a solenoid.

5. The method of claim 1, wherein the electrically operated switch is a transistor.

6. The method of claim 1, wherein the electrically operated switch is a relay.

7. The method of claim 1, wherein the train control system is passive.

8. The method of claim 1, wherein the train control system is active.

9. A system comprising:
   a power source;
   an electronic braking system, the electronic braking system being configured to activate the train's brakes if power to the electronic braking system is disrupted, the electronic braking system including a train control interface operable to receive a digital brake activation message from a train control system;
   an electrically controlled switch connected between the power source and, via a first conductor separate from any conductor connected to the train control interface, the electronic braking system, the electrically controlled switch being operable to disrupt a supply of power from the power source to the electrically controlled switch; and
   a train control system connected to control the electrically controlled switch via a second conductor separate from the first conductor, the train control system being configured to prevent the train from violating a restriction on movement of the train by sending a digital brake activation message to the electronic braking system to activate the train's brakes and, if the digital brake activation message does not result in activation of the train's brakes, controlling the electrically operated switch to disrupt the flow of power from the power source to the electronic braking system, whereby the train's brakes are activated.

10. The system of claim 9, wherein the train control system is connected to the train control interface of the electronic braking system via a second conductor separate from the first conductor and is further configured to perform the step of sending a digital brake activation message to the electronic braking system to activate the train's brakes, and wherein the train control system performs the step of controlling the electrically operated switch only if the digital brake activation message does not result in activation of the train's brakes.

11. The system of claim 9, wherein the train control interface is an RS-232 interface.

12. The system of claim 11, wherein the signal is in the form of a multiple bit digital command.

13. The system of claim 9, wherein the electrically operated switch is a solenoid.

14. The system of claim 9, wherein the electrically operated switch is a transistor.

15. The system of claim 9, wherein the electrically operated switch is a relay.

16. The system of claim 9, wherein the train control system is passive.

17. The system of claim 9, wherein the train control system is active.

18. The system of claim 9, wherein the restriction on movement of the train is a speed restriction.

19. The system of claim 9, wherein the restriction on movement of the train is a block boundary.

20. The method of claim 1, wherein the restriction on movement of the train is a speed restriction.

21. The method of claim 1, wherein the restriction on movement of the train is a block boundary.

* * * * *